(12) United States Patent
Strasser

(10) Patent No.: US 12,396,399 B2
(45) Date of Patent: Aug. 26, 2025

(54) REEL AND CUTTER BAR FLOATING SYSTEM FOR A COMBINE HARVESTER PLATFORM, COMBINE HARVESTER PLATFORM AND AGRICULTURAL MACHINE

(71) Applicant: GTS DO BRASIL LTDA., Bairro Sao Paulo (BR)

(72) Inventor: Assis Strasser, Lages (BR)

(73) Assignee: GTS DO BRASIL LTDA., Bairro Sao Paulo (BR)

( * ) Notice: Subject to any disclaimer, the term of this patent is extended or adjusted under 35 U.S.C. 154(b) by 140 days.

(21) Appl. No.: 17/438,381

(22) PCT Filed: Apr. 9, 2020

(86) PCT No.: PCT/BR2020/050122
§ 371 (c)(1),
(2) Date: Sep. 10, 2021

(87) PCT Pub. No.: WO2020/206521
PCT Pub. Date: Oct. 15, 2020

(65) Prior Publication Data
US 2024/0381812 A1    Nov. 21, 2024

(30) Foreign Application Priority Data

Apr. 10, 2019   (BR) .......................... 1020190073039

(51) Int. Cl.
*A01D 57/04*   (2006.01)
*A01D 41/14*   (2006.01)
*A01D 57/20*   (2006.01)

(52) U.S. Cl.
CPC ............. *A01D 57/04* (2013.01); *A01D 41/14* (2013.01); *A01D 57/20* (2013.01)

(58) Field of Classification Search
CPC ...... A01D 57/04; A01D 57/02; A01D 57/025; A01D 57/20; A01D 41/14; A01D 41/141;
(Continued)

(56) References Cited

U.S. PATENT DOCUMENTS 3,653,194 A    4/1972   Lachman
3,683,748 A *  8/1972   Mahl ...................... A01D 57/04
                                                    137/625.68
(Continued)

FOREIGN PATENT DOCUMENTS

CA    2876686 A1    6/2016
EP    0373406 A1 *  6/1990
GB    1376831 A     12/1974

OTHER PUBLICATIONS

EP 0373406 A1—English translation (Year: 1990).*
International Search Report for corresponding application PCT/BR2020/050122 dated Oct. 15, 2020 and English translation.

*Primary Examiner* — Matthew Troutman
*Assistant Examiner* — Julia C Tran
(74) *Attorney, Agent, or Firm* — LUCAS & MERCANTI, LLP

(57) ABSTRACT

The present invention pertains to the fields of mechanical engineering and agriculture, and more specifically to platform technology for harvesters, specifically grain harvesters. In this regard, the present invention describes a cutting bar (1) and reel fluctuation system for a harvester platform comprising: a supporting element for the reel (11), a supporting element for the cutting bar (13); in which the supporting element for the reel (11) fastens the reel in a horizontal position on the harvester platform; and in which the supporting element for the cutting bar (13) fastens the cutting bar (1) in a horizontal position on the harvester platform; the cutting bar (1) and reel fluctuation system also including a articulation element of the reel (12); in which the (Continued)

articulation element of the reel (12) mechanically connects the supporting element for the reel (11) and the supporting element for the cutting bar (13); and in which the articulation element of the reel (12) is designed to adjust the fluctuation between the cutting bar and the reel, and also a harvester platform and agricultural machine using said fluctuation system.

6 Claims, 10 Drawing Sheets

(58) Field of Classification Search
CPC ... A01D 41/145; A01D 61/002; A01D 61/008
See application file for complete search history.

(56) References Cited

U.S. PATENT DOCUMENTS

| | | | | |
|---|---|---|---|---|
| 4,124,970 A | * | 11/1978 | Bernhardt | A01D 57/04 |
| | | | | 56/DIG. 15 |
| 4,206,584 A | * | 6/1980 | Johnson | A01D 41/14 |
| | | | | 56/15.8 |
| 5,752,372 A | * | 5/1998 | Buermann | A01D 57/04 |
| | | | | 56/130 |
| 10,524,422 B2 | * | 1/2020 | Brimeyer | A01D 41/06 |
| 2003/0074876 A1 | * | 4/2003 | Patterson | A01D 41/144 |
| | | | | 56/257 |
| 2008/0072560 A1 | * | 3/2008 | Talbot | A01D 41/14 |
| | | | | 56/208 |
| 2008/0295473 A1 | * | 12/2008 | Tippery | A01D 41/144 |
| | | | | 56/153 |
| 2010/0011728 A1 | * | 1/2010 | Pietricola | A01D 57/04 |
| | | | | 56/14.4 |
| 2014/0295922 A1 | * | 10/2014 | Buermann | A01D 41/06 |
| | | | | 460/149 |
| 2015/0121830 A1 | * | 5/2015 | Gahres | A01D 34/008 |
| | | | | 56/153 |
| 2016/0242358 A1 | * | 8/2016 | Mossman | A01D 61/008 |
| 2018/0092305 A1 | * | 4/2018 | Cook | A01D 57/025 |

* cited by examiner

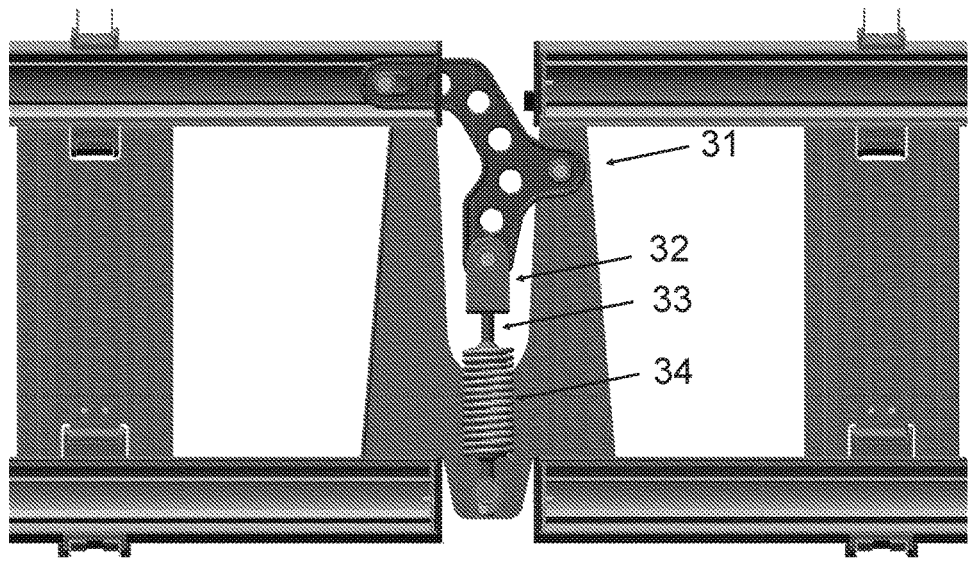
Fig. 17
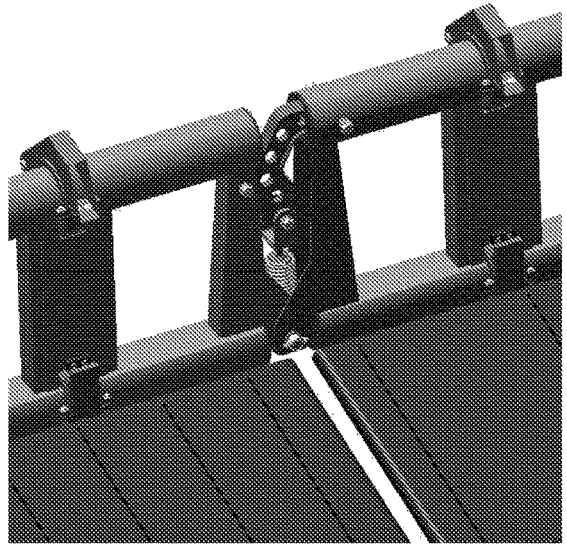 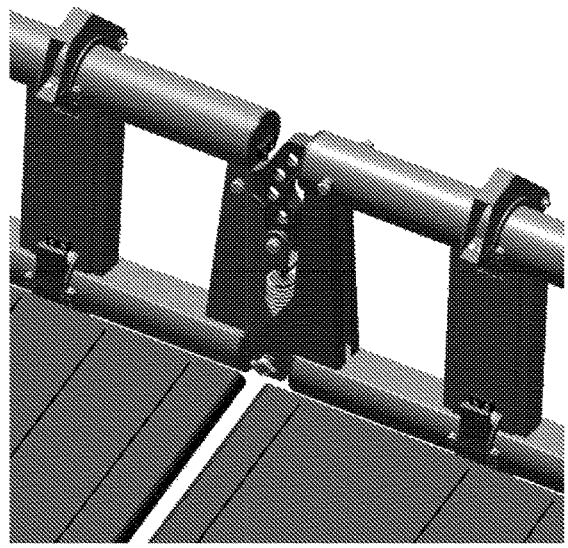
Fig. 18a				Fig. 18b

REEL AND CUTTER BAR FLOATING SYSTEM FOR A COMBINE HARVESTER PLATFORM, COMBINE HARVESTER PLATFORM AND AGRICULTURAL MACHINE

CROSS REFERENCE TO RELATED APPLICATION

This Application is a 371 of PCT/BR2020/050122 filed on Apr. 9, 2020 which, in turn, claimed the priority of Brazilian Patent Application No. BR 1020190073039 filed on Apr. 10, 2019, both applications are incorporated herein by reference.

FIELD OF THE INVENTION

The present invention refers to the field of mechanical engineering and agriculture, more precisely it refers to a technology of combine harvester platforms, specifically grain combine harvesters.

BACKGROUND OF THE INVENTION

The present invention refers to the field of agricultural machinery, more specifically a side floating system of the chassis on grain combine harvester platforms, preferably cereals, and describes a platform for agricultural machinery that keeps the parts of the platform closer to the ground.

During the agricultural production process, several techniques and steps are used to improve the productivity and efficiency of services, thus increasing the amount to be harvested. In order to increase crop productivity, agricultural machinery is constantly planned and/or modified to carry out the necessary agricultural operations more effectively.

Such agricultural machines can be classified as soil preparation machines, sowing, planting and transplanting machines, in addition to machines for loading, transporting and applying chemical fertilizers and soil correctors. There are also machines for cultivation, thinning and pruning, pesticide application machines, as well as harvesting machines. Regardless of the classification, the machines used in the agricultural process have as main objective to increase the productivity and efficiency of agricultural work.

Notably with respect to harvesting machines, especially grain combine harvesters, currently platforms must adapt to different harvesting conditions, whether in curves or adverse terrain conditions arising from different factors, even so focusing on the greatest possible use of the platform area.

Thus, there is a need for cuts closer to the ground, especially on the sides of long platforms, avoiding as much as possible high cuts in the crop, which generate loss of production, without, however, the platforms touching the ground or being dragged during harvesting, which causes damage to the bars and premature wear of the platform elements.

Several types of different harvesting platforms have been created in recent years. Currently there are two main concepts, the first being the snail type and the second the draper-type.

In this regard, the platforms most used today are still of the snail type, as they are simpler and generally have lower operating costs. Nevertheless, draper-type conveyors, in which the platform uses a conveyor after cutting to move the crop, provide a reduction in losses on the platform, as well as a uniform feeding of the track system, thus improving the performance of the combine harvester by reducing losses in this movement, thus lowering their associated costs, in addition to providing larger sized platforms (while draper-type combine harvesters are commonly available up to 45 feet, snail-type ones are generally only available up to 35 feet), and are increasingly more used.

To drive the same, there are also two main concepts. In a first concept, conveyors are used that can be driven by motors directly coupled to the driving rollers, in the case of draper conveyors, or to the center axis of the snail. In this case, the center feeding assembly of these platforms is composed of a center conveyor located below the feeding snail, in which the center conveyor is arranged in the longitudinal position with the function of transporting the product from the side conveyors towards the center snail, which, in turn, has the function of concentrating the product and pressing it into the combine harvester's neck.

In a second concept, reels driven by hydraulic motors are usually used, given the distance between the drive and the platform chassis, in which the "horizontal" movement of the reel is also performed by hydraulic cylinders. In general, reel floating systems are designed with hydraulic drives and electronic control through sensors and command blocks, in which the sensors read the height of the cutter bar, feeding the command module, which in turn processes the information and commands the hydraulic block by raising or lowering the reel assembly.

STATE OF THE ART

In view of the disclosure above, some documents can be mentioned as the most representative of the State of the Art for the technology in question.

In this regard, European Patent EP 3152999 B1 can be mentioned, which describes a center drive of the cutter bar, with drives by means of shafts or hydraulic motors, as well as U.S. Pat. No. 7,992,372 B1, which describes a chassis split into three distinct parts, in which the side parts are pivotally movable with respect to the center part.

Obviously, these systems described in the mentioned documents and ordinary in the state of the art are complex and depend on specific knowledge for operation and maintenance, in addition to being delicate systems for field operation, in which the machines are subjected to extreme conditions of use and environment (humidity, dust, heat, cold, among others).

Further, for platform designs over fifty feet wide, side fluctuation of the equipment is extremely difficult, as the overall length generates a low terrain copying ability, as seen in previously-described U.S. Pat. No. 7,992,372 B1.

In addition, current combine harvesters are not prepared to raise platforms laterally with speed and precision, as they mainly use hydraulic devices for such movements.

In view of the disclosure above, it is clear that there is no simplified solution in the literature for platforms to make cuts closer to the ground, especially on the sides of long platforms, without, however, the platforms touching the ground or being dragged during the harvesting, thus enabling the creation of longer platforms with a high ability of copying the terrain.

An element that simply and quickly carries out these functions during the harvest is essential to increase the productivity and efficiency of agricultural work.

BRIEF DESCRIPTION OF THE INVENTION

The present invention relates to a reel and cutter bar floating system for a combine harvester platform, comprising: a reel support element; a cutter bar support element;

wherein the reel support element secures the reel in a horizontal position on the combine harvester platform; and wherein the cutter bar support element secures the cutter bar in a horizontal position on the combine harvester platform; wherein the cutter bar and reel floating system further comprises: a reel pivot element; wherein the reel pivot element mechanically connects the reel support element and the cutter bar support element; and wherein the reel pivot element is configured to regulate the fluctuation between the cutter bar and the reel.

Preferably, in such a floating system, the reel pivot element regulates the fluctuation between the cutter bar and the reel by modifying the distance of the reel with the cutter bar, wherein the reel support element and the cutter bar support element are interconnected with each other. The reel pivot element may comprise an arm actuator; wherein the smaller the arm actuator opening, the greater the distance between the reel and cutter bar, and the greater the arm actuator opening, the shorter the distance between the reel and cutter bar.

Furthermore, in a preferred configuration of the proposed floating system, the reel pivot element may comprise a spring actuator and a cutter bar pressure relief spring; wherein the cutter bar pressure relief spring provides stretch and tension forces to balance the resulting cutter bar weight; wherein the spring actuator is configured to modify the stretch and tension forces of the cutter bar pressure relief spring and control the pressure of the cutter bar over the ground by opening the spring actuator; wherein the smaller the spring actuator opening, the smaller the cutter bar pressure over the ground, and the larger the spring actuator opening, the greater the cutter bar pressure over the ground.

In this regard, the reel support element may further comprise an upper spring support, a round fixed bushing, a chamfered fixed bushing and a reel support; wherein the reel support is mechanically connected to the reel and the round fixed bushing to the upper spring support; wherein the round fixed bushing is mechanically connected to the chamfered fixed bushing forming a sliding element between the tube and the reel support and also between the tube and the cutter bar support; wherein a combine harvester platform frame bar passes between the round fixed bushing and the chamfered fixed bushing to secure the reel in a fixed position horizontally on the combine harvester platform; and wherein the upper spring support secures the cutter bar pressure relief spring to the reel.

Additionally, the floating system may comprise a side floating system of the chassis; wherein the side floating system of the chassis mechanically connects a chassis side of the combine harvester platform with respect to a chassis center portion of the combine harvester platform; wherein the side floating system of the chassis moves vertically with respect to the ground the chassis side portion of the combine harvester platform and the chassis side portion of the combine harvester platform pivotally with respect to the chassis center portion of the combine harvester platform.

In this regard, the side floating system of the chassis may comprise an pivoting arm, a spring support, a spring rod and a lifting spring; wherein the pivoting arm mechanically connects the chassis side portion of the combine harvester platform with respect to the chassis center portion of the combine harvester platform; wherein the spring support and spring rod secure the lifting spring in a position between the chassis side portion of the combine harvester platform and the chassis center portion of the combine harvester platform; and wherein the lifting spring moves vertically with respect to the ground the chassis side portion of the combine harvester platform, and the pivoting arm pivotally moves the chassis side portion of the combine harvester platform with respect to the chassis center portion of the combine harvester platform.

Finally, the floating system can further comprise a feeding system by center conveyors, which in turn may comprise a lower center conveyor, an upper center conveyor, a moving element of the conveyors and a rear support spring; wherein the conveyor moving element moves the lower center conveyor with respect to the upper center conveyor by means of the rear support spring.

Obviously, a combine harvester platform is provided, comprising at least a chassis, a reel and a cutter bar, wherein the combine harvester platform comprises a floating system as defined above. Such a combine harvester platform may further comprise a chassis side portion of the combine harvester platform and a center chassis portion of the combine harvester platform.

Finally, an agricultural machine is provided, which comprises a floating system or a combine harvester platform as defined above.

BRIEF DESCRIPTION OF THE FIGURES

The present invention will be described below with reference to typical embodiments thereof and also with reference to the attached drawings, in which:

FIG. 17 is an enlarged section front view of the platform connection region, highlighting the assembly position of the side floating system of the chassis, according to a preferred configuration of the present invention;

FIG. 18a is an enlarged right isometric view of the platform connection region, highlighting the assembly of the system on the platform, according to a preferred configuration of the present invention;

FIG. 18b is an enlarged left isometric view of the platform connection region, highlighting the assembly of the system on the platform, according to a preferred configuration of the present invention;

DETAILED DESCRIPTION OF THE INVENTION

As previously described, the present invention refers to the field of agricultural machinery, more specifically a side floating system of the chassis on combine harvester platforms for grains, preferably cereals, and describes a platform for agricultural machinery that keeps the platform parts closer to the ground.

As can be seen in FIGS. 1 to 6, the combine harvester platform according to the present invention comprises a mechanical reel and cutter bar floating system 1, a feeding system by center conveyors 2 and a side floating system of the chassis 3. In this regard, FIGS. 1 and 2 clearly show the three elements described, while FIGS. 3 and 4 highlight the feeding system by center conveyors 2 pointing out the position of both conveyors, one located at the base of the platform and the other located in the upper portion of a center region of the combine harvester platform.

Figure 1:
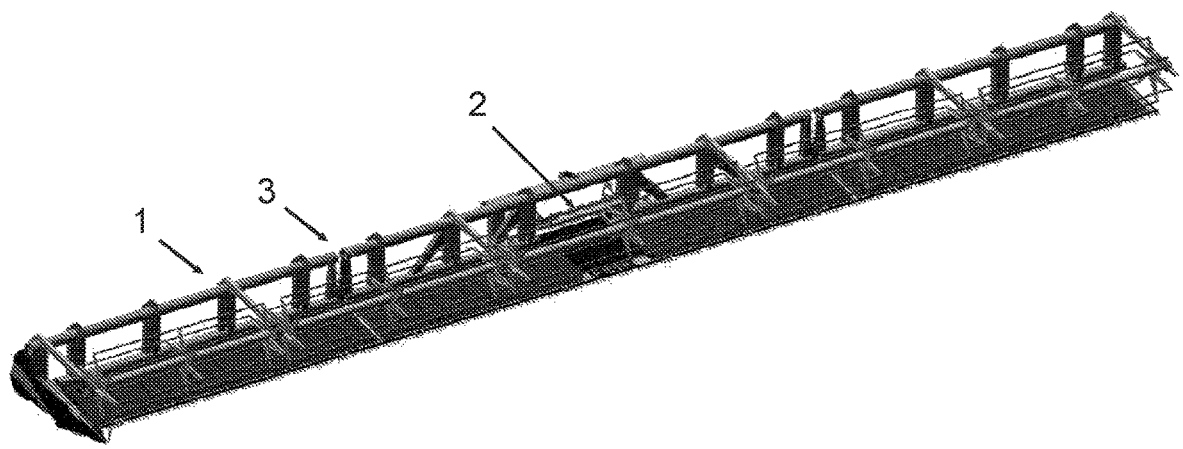
FIG. 1 is a front isometric view of the platform, according to a preferred configuration of the present invention.
Figure 2:
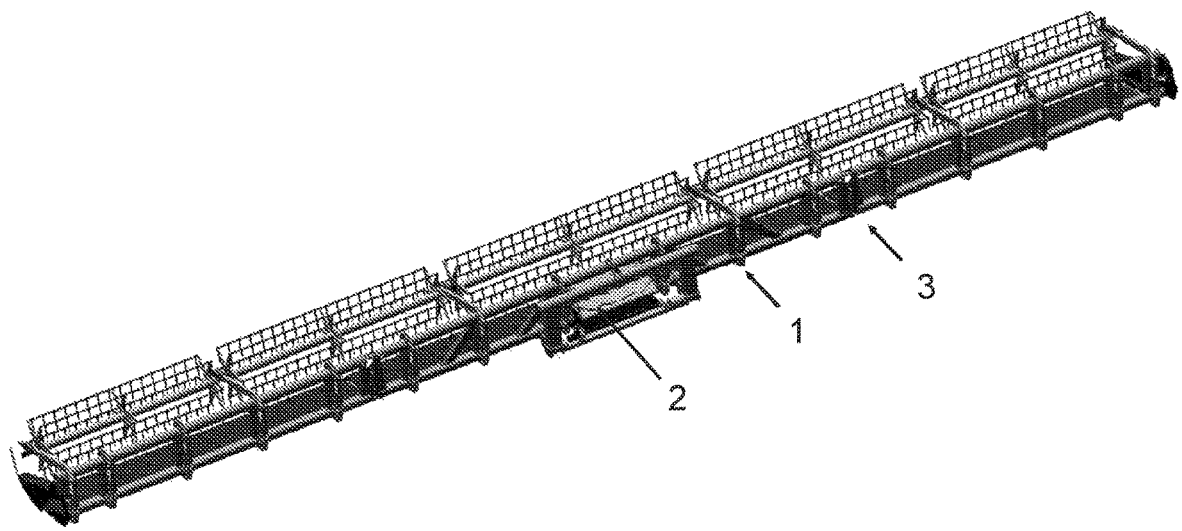
FIG. 2 is a rear isometric view of the platform, according to a preferred configuration of the present invention.
Figure 3:
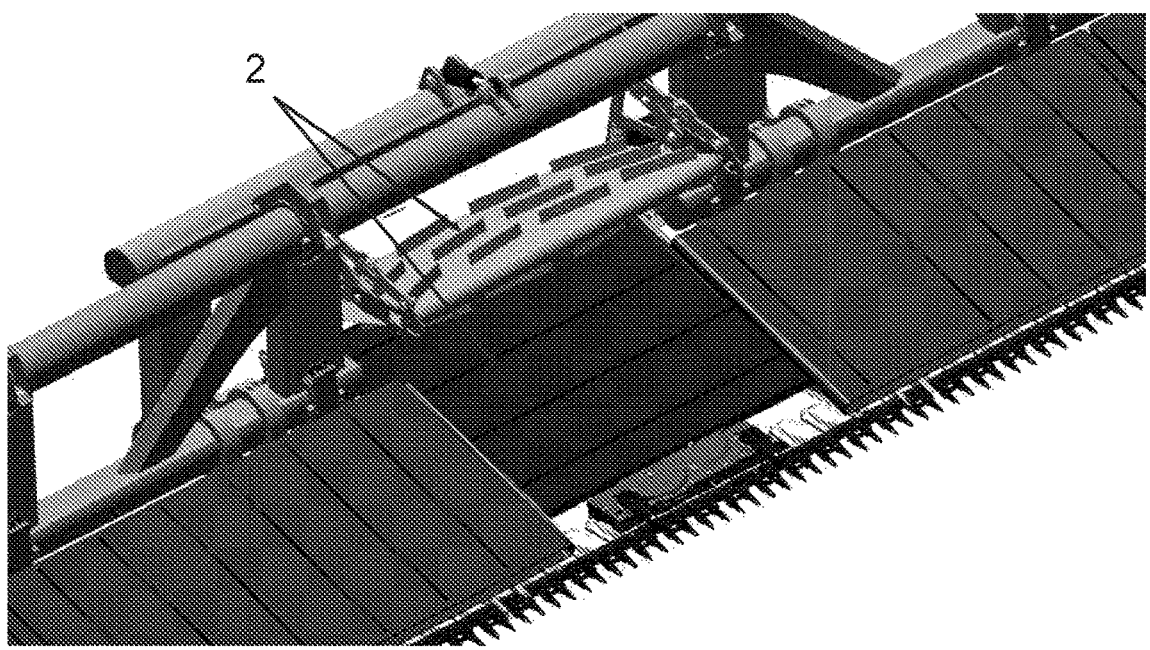
FIG. 3 is a front isometric view highlighting the feeding system by center conveyors, according to a preferred configuration of the present invention.
Figure 4:
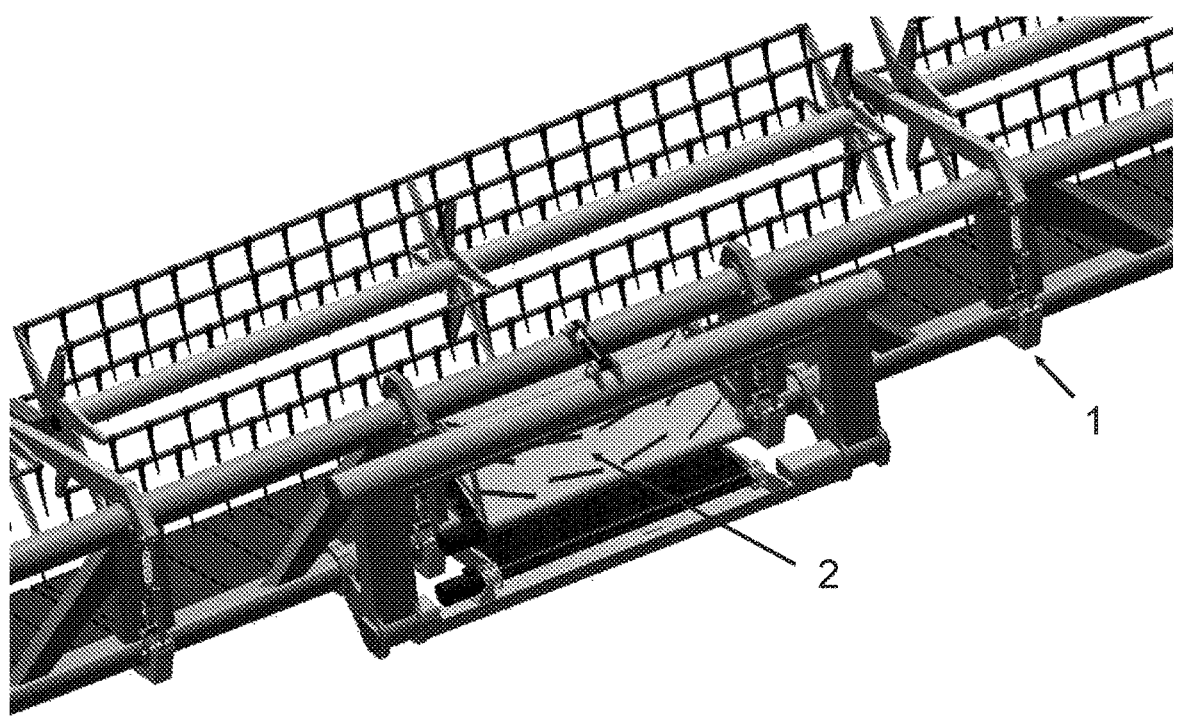
FIG. 4 is a rear isometric view highlighting the feeding system by center conveyors, according to a preferred configuration of the present invention.
Figure 5:
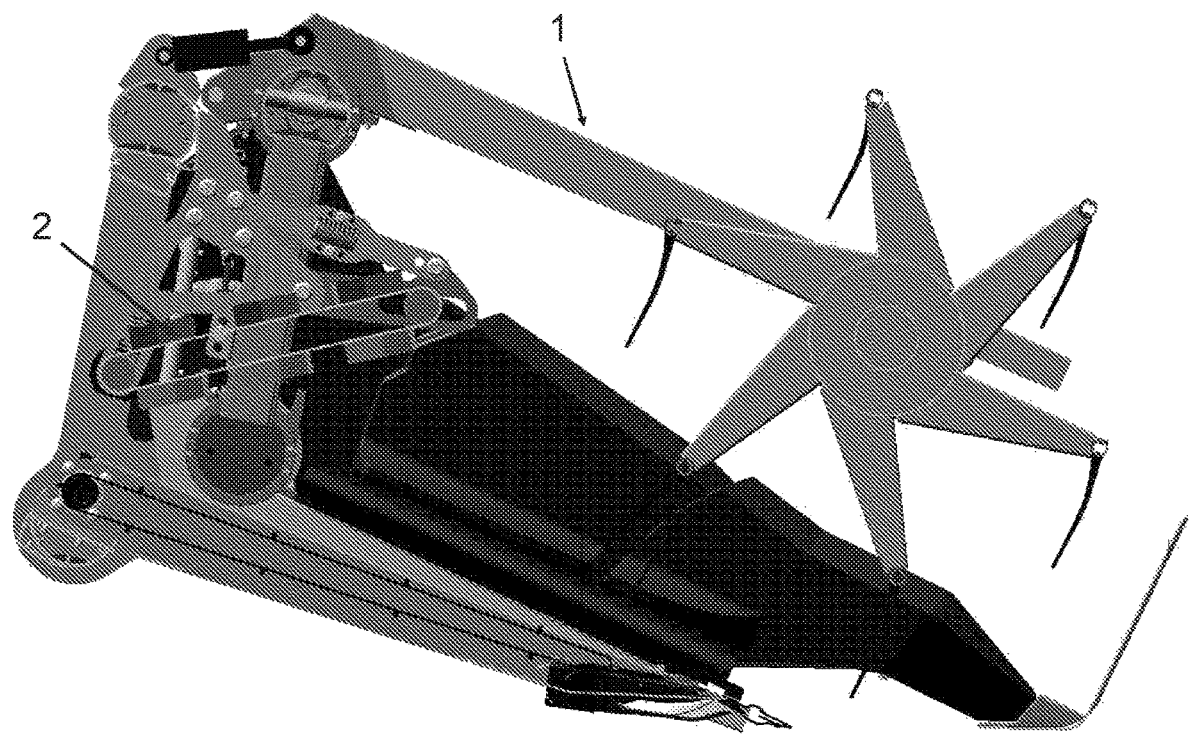
FIG. 5 is a side section view of the center region of the platform, highlighting the position of the mechanical floating system of the reel and cutter bar and the center conveyor feeding system, according to a preferred configuration of the present invention.

FIG. 5, in turn, shows the side section view of the center region of the combine harvester platform, as well as the position of the mechanical reel and cutter bar floating system 1 and the feeding system by center conveyors 2. Other elements can be seen in this figure, such as nozzles, stops, cutting rollers, conveyors, among others, but these elements are considered ordinary in the state of the art.

FIGS. 6 to 12, in turn, illustrate the mechanical reel and cutter bar floating system 1 according to a preferred configuration of the present invention.

Figure 6:
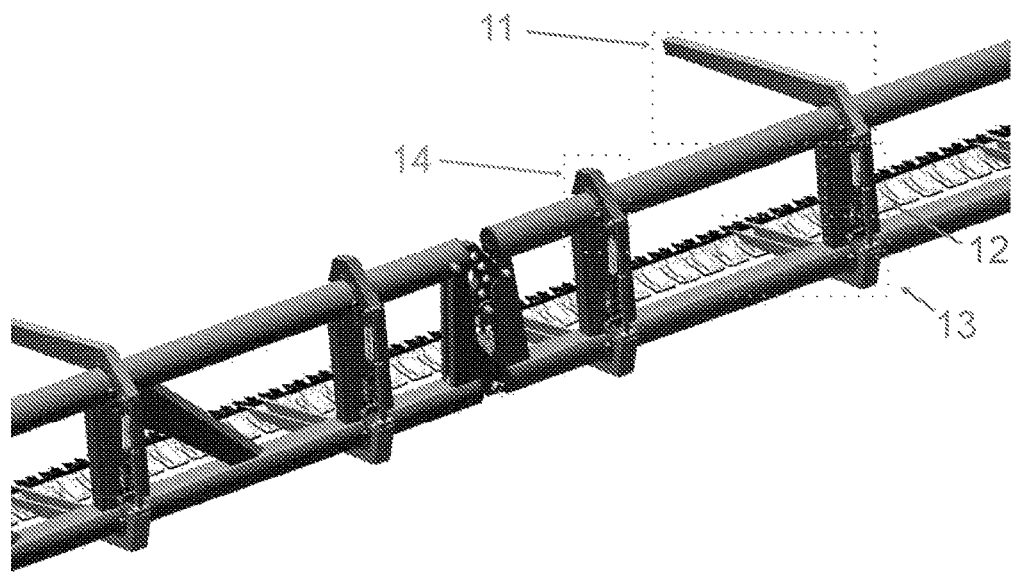
FIG. 6 is an enlarged view of the platform highlighting the reel support arm, the cutter bar support arm and the fixed support, according to a preferred configuration of the present invention.

As can be seen in FIG. 6, it prominently shows a reel support element 11, a reel pivot element 12, a cutter bar support element 13 and a fixed support element 14. All elements will be later described more clearly and in detail.

Figure 7:
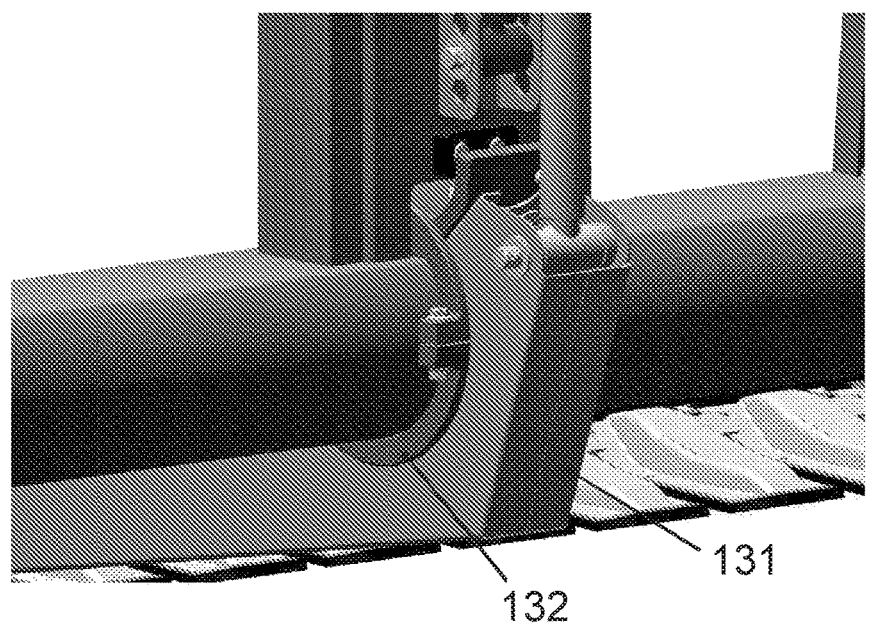
FIG. 7 is an enlarged view of the platform highlighting the support arm of the cutter bar and the round fixed bushing, according to a preferred configuration of the present invention.
Figure 8:
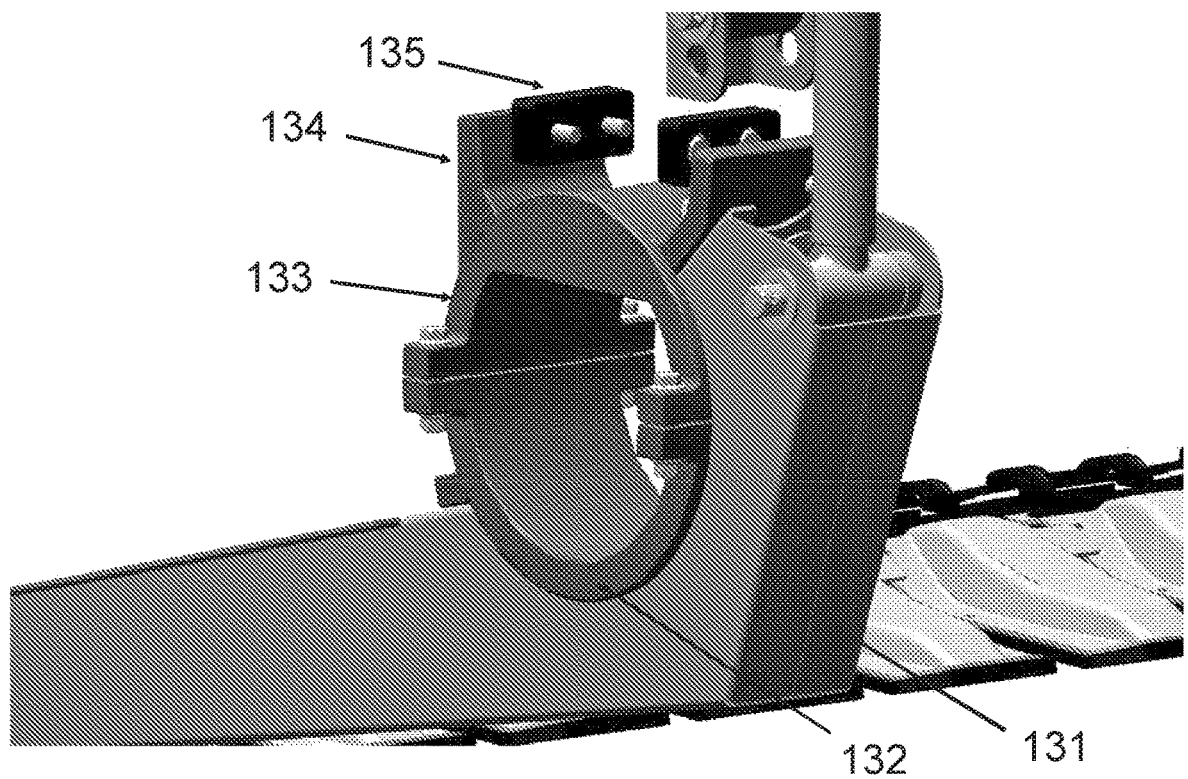
FIG. 8 is an enlarged view of the platform highlighting the support arm of the cutter bar, the round fixed bushing, the chamfered fixed bushing, the sliding bushing and the fixed stop, according to a preferred configuration of the present invention.

FIGS. 7 and 8 illustrate the preferred configuration of the cutter bar support element 13, which comprises a cutter bar support arm 131 and a round fixed bushing 132, as seen in FIG. 7. Additionally, the FIG. 8 illustrates a chamfered fixed bushing 133, a sliding bushing 134, and a fixed stop 135.

Figure 9:
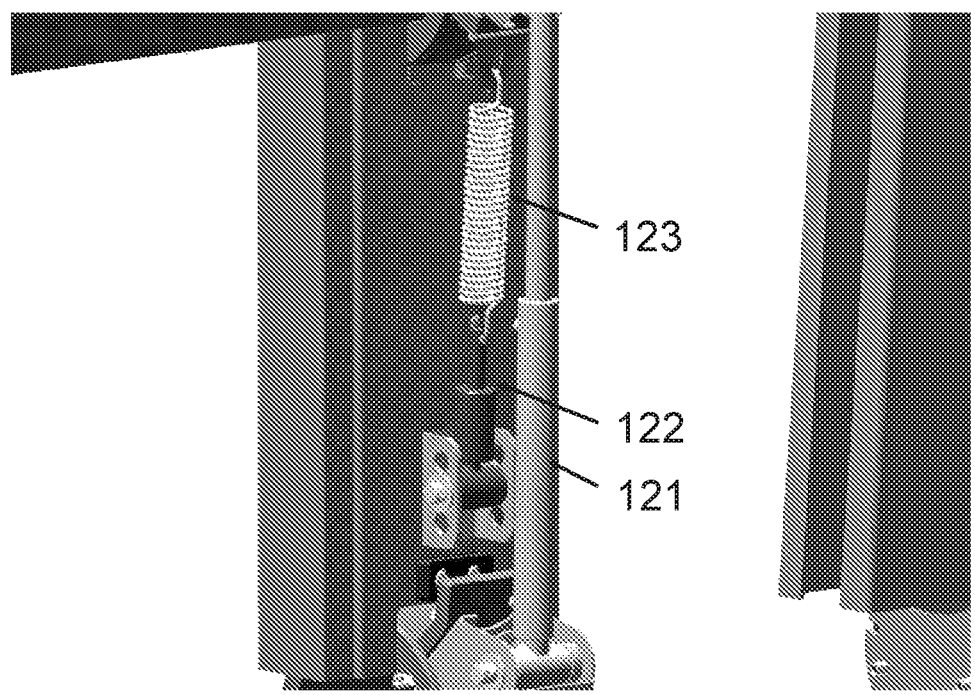
FIG. 9 is an enlarged view of the platform highlighting the arm actuator, the spring actuator and the cutter bar pressure relief spring, according to a preferred configuration of the present invention.

FIG. 9, in turn, shows the reel pivot element 12, which preferably comprises an arm actuator 121, a spring actuator 122 and a cutter bar pressure relief spring 123.

Figure 10:
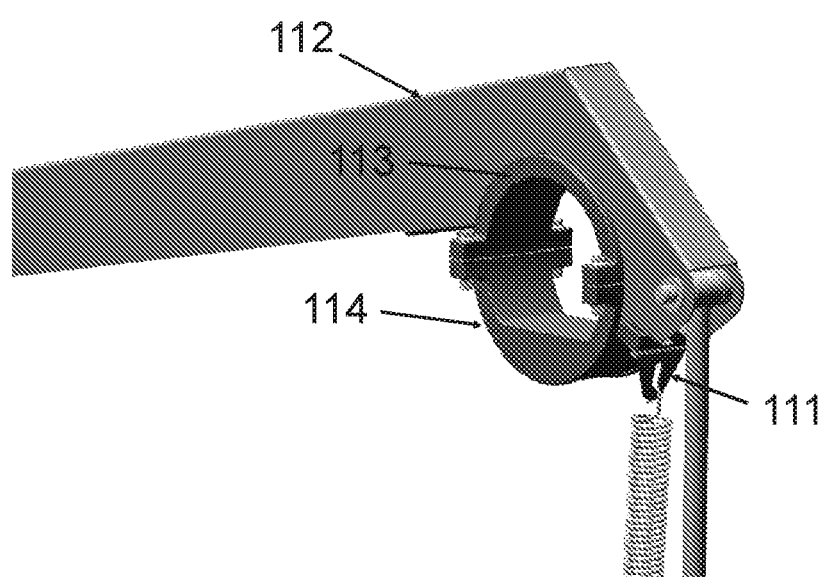
FIG. 10 is an enlarged view of the platform highlighting the upper spring support, the round fixed bushing, the chamfered fixed bushing and the reel support arm, according to a preferred configuration of the present invention.

Additionally, FIG. 10 illustrates the reel support element 11, which preferably comprises an upper spring support 111, a round fixed bushing 113, a chamfered fixed bushing 113 and a reel support 112.

Obviously, the upper spring support 111, the round fixed bushing 112 and the chamfered fixed bushing 113 are similar to the cutter bar support 131, the round fixed bushing 132 and the chamfered fixed bushing 133, which may be elements identical in a second preferred configuration.

Figure 11:
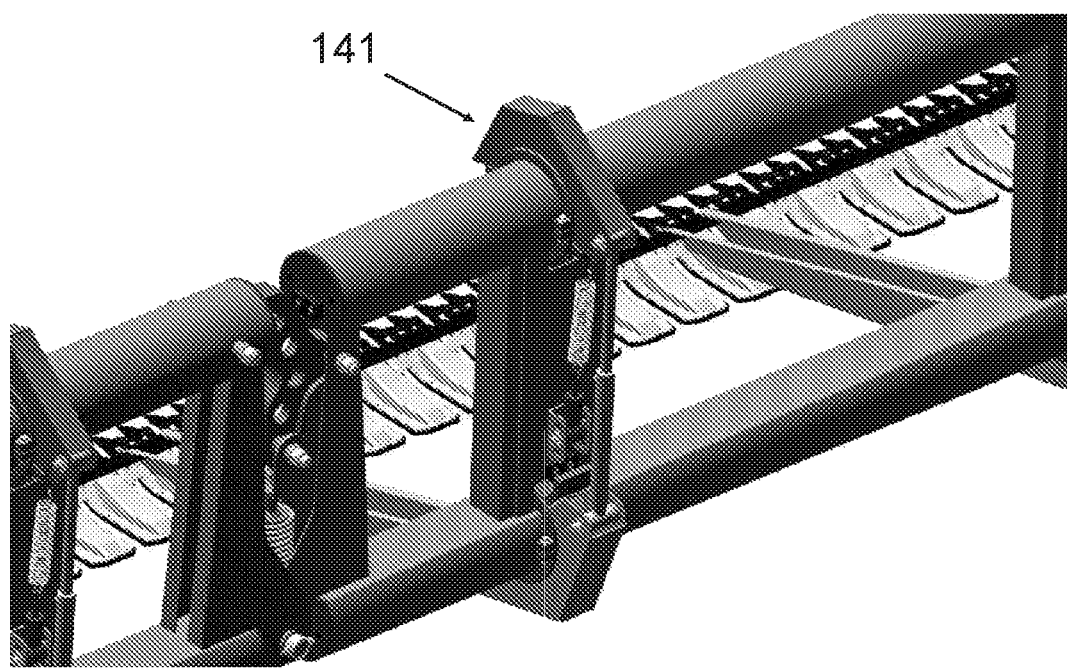
FIG. 11 is an enlarged view of the platform highlighting the fixed upper support of the floating system, according to a preferred configuration of the present invention.

In this regard, FIG. 11 illustrates a fixed support element 14 according to the preferred configuration of the present invention, comprising a fixed upper support 141 of the floating system.

Figure 12:
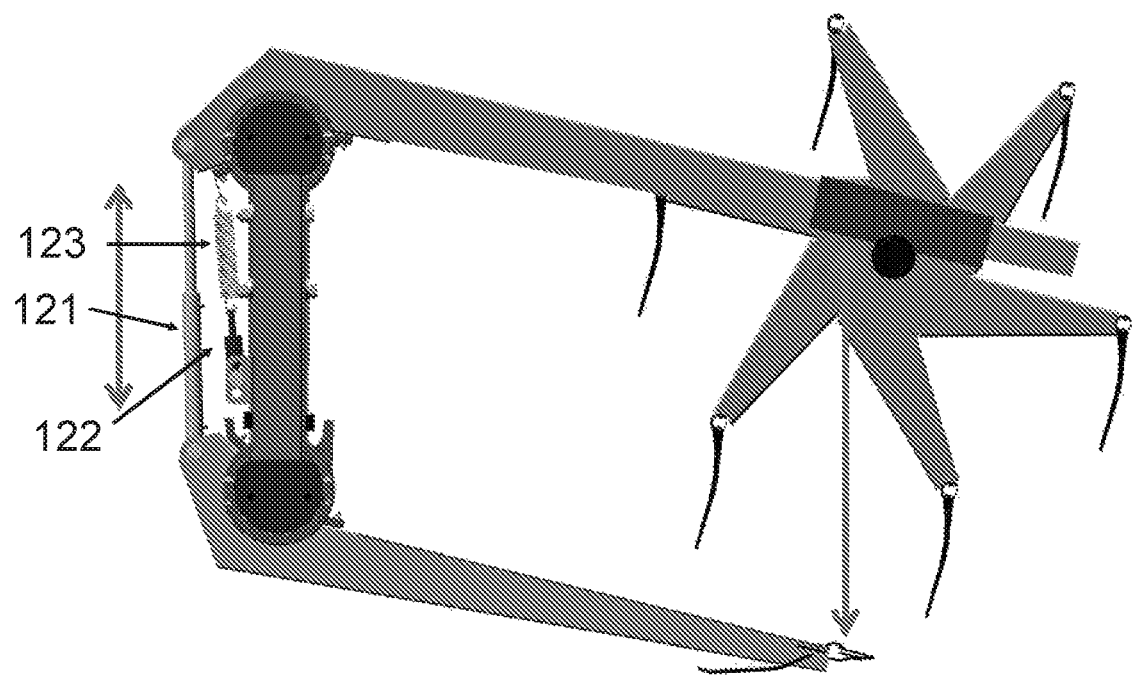
FIG. 12 is a side section view of the platform, highlighting the regulation elements of the simultaneous fluctuation between the cutter bar and the reel, according to a preferred configuration of the present invention.

Finally, as can be seen in FIG. 12, the regulation of the fluctuation can be done simultaneously between the cutter bar and the reel, according to the actuator length, which in turn defines the distance from the reel to the cutter bar. The smaller the opening of the arm actuator 121, the greater the distance from the reel to the cutter bar, and the more open the actuator, the smaller the distance between the ends of the arms.

Further, the pressure of the cutter bar over the ground is controlled by the opening of the spring actuator 122, in which the smaller the opening of the spring actuator 122, the lower the pressure of the bar over the ground. In this regard, the system regulation is the working pressure of the cutter bar over the ground, in which the pressure must be regulated in such a way that the platform copies the terrain undulations without dragging the arms too much against the ground. To do this, the spring actuator 122 must be of a length that balances these spring stretching forces and the resulting weight of the arm. Obviously, such actuators as defined above can be of different types, and generally are hydraulic or mechanical; essentially, these actuators regulate the distance between the anchorage points.

In this case, the system has a clear advantage that is to keep the arms always interconnected with small actuator length controls.

Therefore, the mechanical reel and cutter bar floating system 1, according to the present invention, provides exact control of the cutter bar pressure over the ground, in addition to concurrently controlling the regulation of the reel distance to the cutter bar, simply carrying out the correct fluctuation of the cutter bar during harvesting.

In a simplified way, the mechanical reel and cutter bar floating system 1 according to the present invention allows the working distance between the pick-up fingers to be a fixed distance from the cutter bar, thus avoiding possible damage to the components. Furthermore, as the system is completely mechanical, the maintenance of the pre-established distance does not depend on complex electronic systems, which clearly simplifies manufacturing and maintenance, and also reduces costs thereof.

Obviously, it is foreseen that the control of the actuators be done manually by an operator with an electrical control in the cabin, or even automatically with a precise system of sensors and a controller, which automatically adjusts the fluctuation according to the needs determined by the sensors, without the intervention of an operator.

Figure 13:
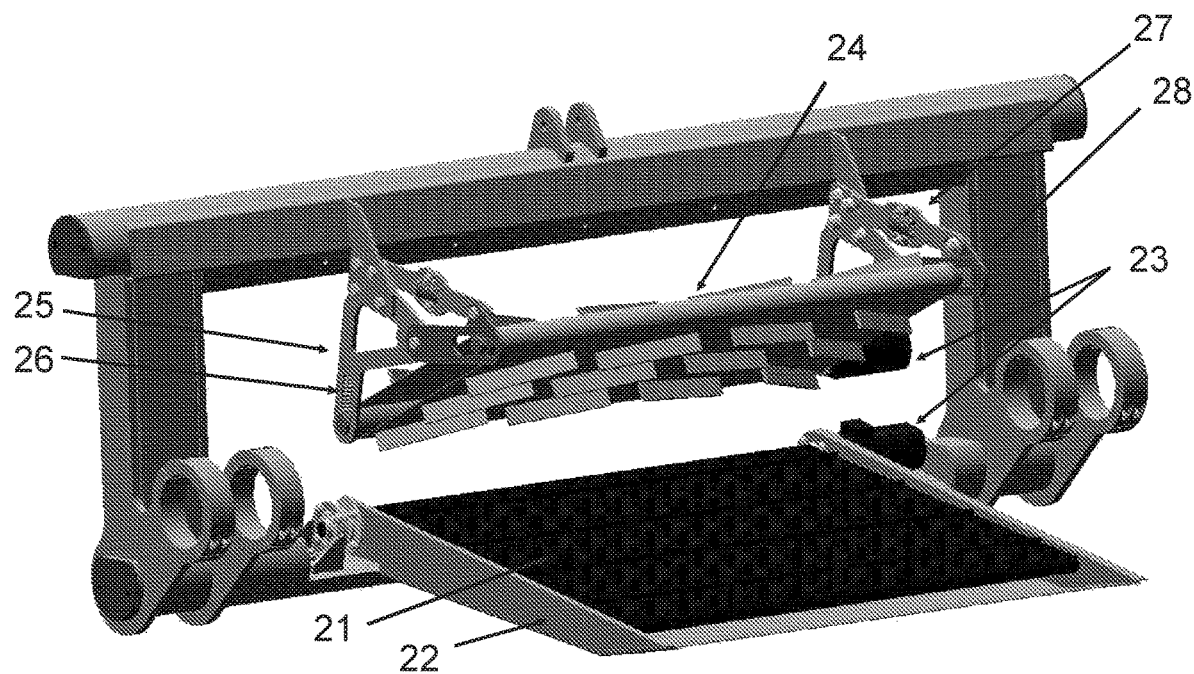
FIG. 13 is a view of the elements that comprise the feeding system by center conveyors, according to a preferred configuration of the present invention.
Figure 14:
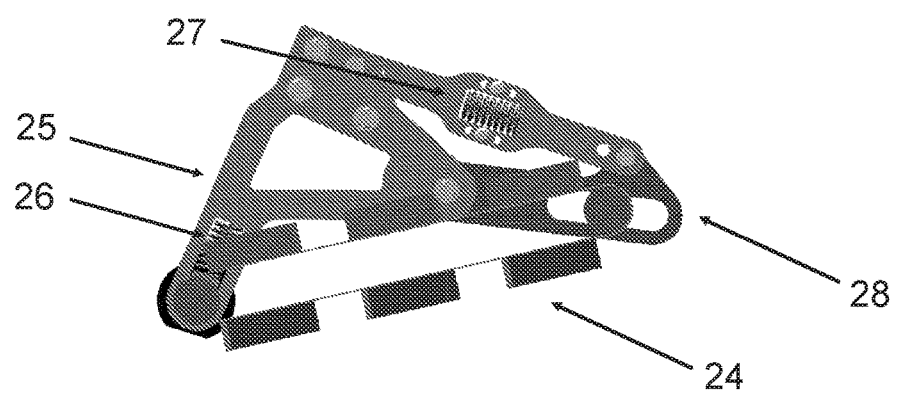
FIG. 14 is a side section view of the elements that comprise the feeding system by center conveyors, according to a preferred configuration of the present invention.

FIGS. 13 and 14 show the elements that make up the feeding system by center conveyors 2 according to a preferred configuration of the present invention. In this regard, as can be seen in FIG. 13, the feeding system by center conveyors 2 preferably comprises a lower center conveyor 21, a lower protection 22, a conveyor moving element 23, preferably an electric motor, an upper center conveyor 24, a rear support 25, a rear support spring 26, an upper support 27 and a front guide 28. FIG. 14 highlights the same elements as in FIG. 13, but in a section view.

In this regard, the feeding system by center conveyors 2 receives the crops being harvested by means of the side conveyors, and directs the same to the interior of the agricultural machine, where they will be stored for transport. Accordingly, the center feeding conveyors have the function of transporting the product from the side conveyors to the center of the machine, and consequently to the feeder conveyor of the combine harvester. Thus, the function of the center conveyors is to feed the combine so that it processes the crop and supplies only the grains, in which the upper conveyor has the function of compacting the harvested material so that it is transported inside the combine harvester. Depending on the harvest condition, type of crop, crop yield and number of plants per cultivated area, this mass of material can have different densities. Furthermore, the higher the harvest speed, the greater the volume to be compacted, thus increasing the density of the material to be compacted.

Therefore, the system according to the present invention replaces the snail systems ordinarily used in draper-type harvesting platforms in order to improve the platform feed to the combine, since the conveyors, due to improvements in floating elements, may approach the combine harvester conveyor. In this system, the conveyors can "enter" the combine harvester's neck due to the geometry of the conveyor drive rollers. In this way, the upper conveyor floating system makes the entire platform flexible, even in the center. The movement of the lower center conveyor is accompanied by the upper center conveyor while wholly floating the system.

Another advantage of this system is the possibility of floating on the rear support 25, which works together with the rear support spring 26. In cases of non-uniform feeding harvest, the conveyor can compensate for excess product by moving upwards, thus increasing the product inlet area.

Finally, FIGS. 15 to 19b illustrate the elements of the side floating system of the chassis 3.

Figure 15:
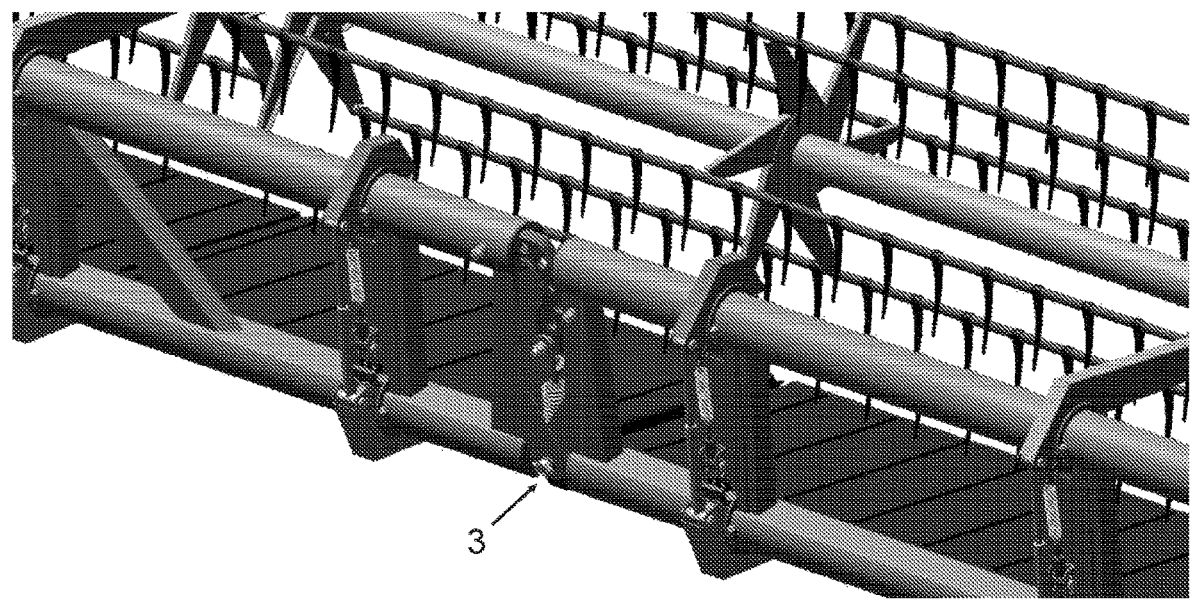
FIG. 15 is an enlarged isometric view of the platform connection region, highlighting the assembly position of the side floating system of the chassis, according to a preferred configuration of the present invention.
Figure 16:
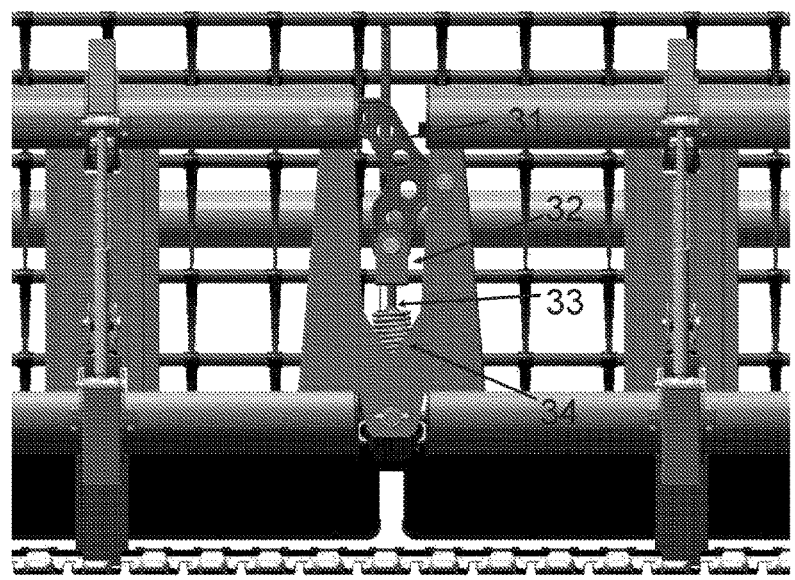
FIG. 16 is an enlarged front view of the platform connection region, highlighting the assembly position of the side floating system of the chassis, according to a preferred configuration of the present invention.
Figure 19A:
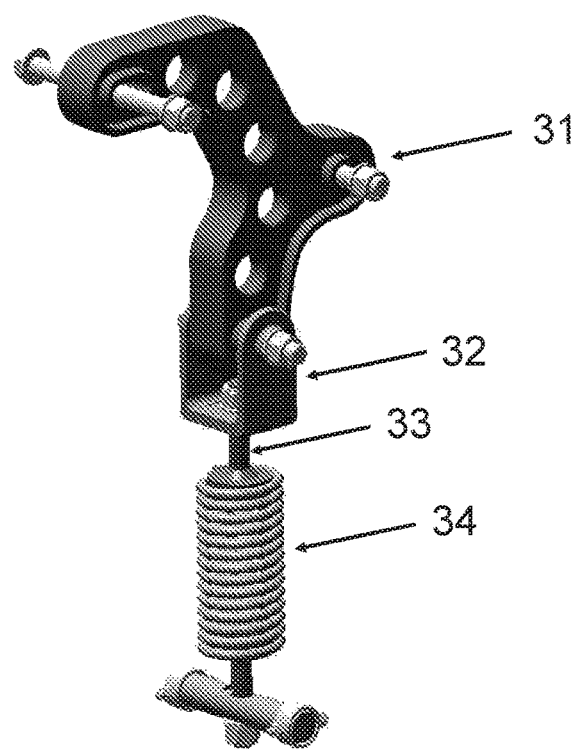
FIG. 19a is a front isometric view of the platform pivoting system, according to a preferred configuration of the present invention.
Figure 19B:
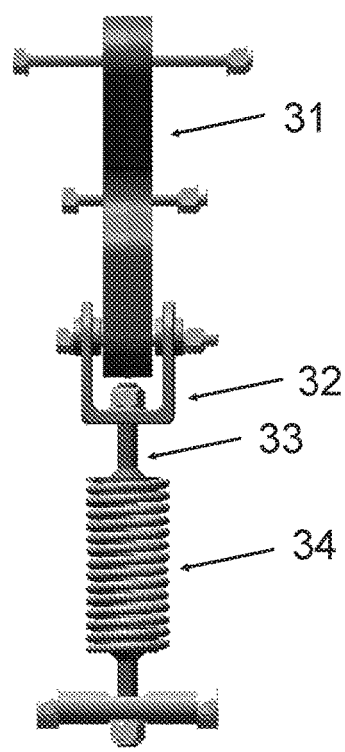
FIG. 19b is a front view of the platform pivoting system, according to a preferred configuration of the present invention.

In this regard, FIG. 15 shows the assembly position of the side floating system of the chassis 3, while FIG. 16 shows the main components of the side floating system of the chassis 3 according to the preferred configuration of the present invention, which preferably comprises a pivoting arm 31, a spring support 32, a spring rod 33 and a lifting spring 34. FIG. 17 illustrates the same components as FIG. 16 in a section view, while FIGS. 18a and 18b illustrate the assembly of the system on the combine harvester platform, in enlarged front and rear isometric views. Finally, FIGS. 19a and 19b show the isolated pivoting system, in a frontal and frontal isometric views.

For large platforms, it is important that the chassis follows the undulations and slopes of the terrain, this being a critical issue for platforms over forty feet wide. The system present in the invention seeks to solve this problem with a completely mechanical assembly, without the action of electrical, electronic or hydraulic elements. In this regard, hydraulic or mechanical chassis compensation systems are provided, and for large platforms (over 50 feet wide) mechanical systems are provided to increase the ability to copy undulating terrain. The cutter bar floating system with a fixed distance from the reel allows, in parallel, to increase the mobility of the chassis. Thus, the side moving system of the chassis, due to this aspect, complements the platform's ability to copy the terrain profile during harvesting.

In this regard, FIGS. 15 to 19b illustrate the elements of the system, which keeps the chassis aligned with the terrain as needed. The spring system with levers seeks to balance the weight of the end system with the pressure of the cutter bar over the ground in the portions farther from the center.

Thus, the lifting spring 34 is supported by the spring rod 33, which in turn is fixed to the spring support 32. The spring support 32 maintains the pivoting arm 31 in the balance position of the force of the end of the chassis, during harvest work. The spring must be dimensioned so that the pressure of the cutter bar over the ground is such that there is low wear on the supports and the bar remains close to the ground, in order to avoid losses in the harvest.

Thus, the present invention describes a reel and cutter bar floating system 1 for a combine harvester platform, comprising: a reel support element 11; a cutter bar support element 13; wherein the reel support element 11 secures the reel in a horizontal position on the combine harvester platform; and wherein the cutter bar support element 13 secures the cutter bar 1 in a horizontal position on the combine harvester platform; the cutter bar support element 13 being a flexible element that can be elastically deform so as to provide a better movement of the cutter bar; wherein the cutter bar and reel floating system 1 further comprises: a reel pivot element 12; wherein the reel pivot element 12 mechanically connects the reel support element 11 and the cutter bar support element 13; and wherein the reel pivot element 12 is configured to regulate the fluctuation between the cutter bar and the reel.

Preferably, in such a floating system, the reel pivot element 12 regulates the fluctuation between the cutter bar and the reel by modifying the distance from the reel to the cutter bar, in which the reel support element 11 and the cutter bar support element 13 are interconnected with each other. The reel pivot element 12 may comprise an arm actuator 121; wherein the smaller the opening of arm actuator 121, the greater the distance between the reel and cutter bar 1, and the greater the opening of arm actuator 121, the smaller the distance between the reel and cutter bar 1.

Furthermore, in a preferred configuration of the proposed floating system, the reel pivot element 12 may comprise a spring actuator 122 and a cutter bar pressure relief spring 123; wherein the cutter bar pressure relief spring 123 provides stretch and tension forces to balance the resulting weight of the cutter bar 123; wherein the spring actuator 122 is configured to modify the stretch and tension forces of the cutter bar pressure relief spring 123 and control the pressure of the cutter bar 1 over the ground by opening the spring actuator 122; wherein the smaller the opening of spring actuator 122, the lower the pressure of cutter bar 1 to the ground and the larger the opening of spring actuator 122, the greater the pressure of cutter bar 1 over the ground.

In this regard, the reel support element 11 may further comprise an upper spring support 111, a round fixed bushing 113, a chamfered fixed bushing 114 and a reel support 112; wherein the reel support 112 is mechanically connected to the reel and the round fixed bushing 113 and to the upper spring support 111; wherein the round fixed bushing 113 is mechanically connected to the chamfered fixed bushing 114, forming a sliding element between the tube and the reel support and also between the tube and the cutter bar support; wherein a combine harvester platform frame bar passes between the round fixed bushing 113 and the chamfered fixed bushing 114 so as to secure the reel in a fixed position horizontally on the combine harvester platform; and wherein the upper spring support 111 secures the cutter bar pressure relief spring 123 to the reel.

Additionally, the floating system may comprise a side floating system of the chassis 3; wherein the side floating system of the chassis 3 mechanically connects a chassis side portion of the combine harvester platform with respect to a chassis center portion of the combine harvester platform; wherein the side floating system of the chassis 3 moves vertically with respect to the ground, the chassis side portion of the combine harvester platform and the chassis side portion of the combine harvester platform pivotally with respect to the chassis center portion of the combine harvester platform.

In this regard, the side floating system of the chassis 3 may comprise an pivoting arm 31, a spring support 32, a spring rod 33 and a lifting spring 34; wherein the pivoting arm 31 mechanically connects the chassis side portion of the combine harvester platform with respect to the chassis center portion of the combine harvester platform; wherein the spring support 32 and the spring rod 33 secure the lifting spring 34 in a position between the chassis side portion of the combine harvester platform and the chassis center portion of the combine harvester platform; and wherein the lifting spring 34 moves vertically with respect to the ground the chassis side portion of the combine harvester platform, and the pivoting arm 31 pivotally moves the chassis side portion of the combine harvester platform with respect to the chassis center portion of the platform of harvest.

Finally, the floating system can further comprise a feeding system by center conveyors 2, which in turn can comprise a lower center conveyor 21, an upper center conveyor 24, a conveyor moving element 23 and a rear support spring 26; wherein the conveyor moving element 23 moves the lower center conveyor 21 relative to the upper center conveyor 24 by means of the rear support spring 26.

Obviously, a combine harvester platform is provided, comprising at least one chassis, a reel and a cutter bar 1, wherein the combine harvester platform comprises a floating system as defined above. Such a combine harvester platform may further comprise a chassis side portion of the combine harvester platform and a center chassis portion of the combine harvester platform.

Finally, an agricultural machine is provided, which comprises a floating system or a combine harvester platform as defined above.

ADVANTAGES AND MODIFICATIONS

Thus, in order to simplify the combine harvester platforms to make cuts closer to the ground, especially on the sides of long platforms, without, however, the platform chassis touching the ground, or being dragged during harvesting, thus enabling the creation of longer platforms with a high ability of copying the terrain, as well as providing an element that performs such functions simply and quickly during harvesting, the agricultural machine according to the present invention was developed, in which the combine harvester comprises a mechanical reel and cutter bar floating system 1, a feeding system by center conveyors 2 and a side floating system of the chassis 3.

Accordingly, the invention described above also enables the creation of platforms for harvesting cereals with 80 feet of useful width, however, obviously, it can be applied to smaller platforms.

Nevertheless, the present invention proposes a simpler fully mechanical system, with the installation of springs, dampers, fixed supports, mobile supports and arms, in which the pivot point of the arms is located around the main tubes of the chassis, thus providing a system that is simple, easy to produce and maintain, but robust.

For this reason, the system described is simpler, with the pivoting point in the lower portion through two plates that have the function of supporting column. The entire compensation and damping system of the ends sets are located inside the upper tubes, in which the pivoting system of the cutter bar support arms has the lower tube as its center point.

Furthermore, the system has a clear advantage of keeping the arms always interconnected with small controls of actuator length. In this case, the mechanical reel and cutter bar floating system 1, according to the present invention, provides exact control of the pressure of the cutter bar over the ground, in addition to concurrently controlling the regulation of the distance between the reel and the cutter bar simply carrying out the correct fluctuation of the cutter bar during harvesting.

Additionally, the system according to the present invention replaces the snail systems ordinarily used in draper-type combine harvester platforms in order to improve platform feeding to the combine harvester, since the conveyors, due to improvements in floating elements, may approach the conveyor of the combine harvester. In this system, the conveyors can "enter" the combine harvester's neck due to the geometry of the conveyor drive rollers.

Finally, another advantage of this system is the possibility of floating on the rear support 25, which works together with the rear support spring 26. In cases of non-uniform feeding harvest, the conveyor can compensate for the excess product by displacing the same upwards, thus increasing the area of the product inlet.

In this regard, in the present invention, the proposal is to feed the combine harvester conveyor by means of two longitudinally positioned (upper and lower) conveyors. The lower conveyor advances over the chassis next to the combine harvester conveyor while the upper conveyor has the function of pressing the product into the combine harvester's neck.

Although the invention has been widely described, it is obvious to those skilled in the art that various alterations and modifications can be made without said alterations not being encompassed by the scope of the invention.

Obviously, while specific terms were used such as, for example, "springs", "chamfers", "chassis", "reel", its mere modification to other elements such as, for example, "elastic element", "splines", "body", "movement element", would be foreseen and within the scope of the invention as claimed.

The invention claimed is:
1. A reel and cutter bar floating system for a combine harvester platform, comprising:
a reel support element;
a cutter bar support member;
wherein the reel support element and the cutter bar support member are slidably connected to a chassis pipe of the combine harvester platform by means of a reel pivot element;

wherein the reel pivot element mechanically connects the reel support element and the cutter bar support element; and the reel pivot element is configured to regulate the fluctuation between the cutter bar support member and the reel support element, wherein the reel support element comprises an upper spring support, a round fixed bushing, a chamfered fixed bushing and a reel support;

wherein the reel pivot element comprises a cutter bar pressure relief spring;

wherein the reel support is mechanically connected to the reel and the round fixed bushing and to the upper spring support;

wherein the round fixed bushing is mechanically connected to the chamfered fixed bushing;

a combine harvester platform frame bar passes between the round fixed bushing and the chamfered fixed bushing to secure the reel in a fixed position horizontally on the combine harvester platform; and the upper spring support secures the cutter bar pressure relief spring to the reel.

2. The floating system according to claim 1, wherein the reel pivot element regulates the fluctuation between the cutter bar support member and the reel support element by modifying a distance of the reel with the cutter bar by means of an arm actuator.

3. The floating system according to claim 1, wherein the reel pivot element comprises a spring actuator and the cutter bar pressure relief spring;

wherein the cutter bar pressure relief spring provides stretch and tension forces to balance the resulting weight of the cutter bar;

wherein the spring actuator is configured to modify the stretch and tension forces of the cutter bar pressure relief spring and control a pressure of the cutter bar over the ground through an opening of the spring actuator;

wherein a smaller the opening of the spring actuator, the lower the pressure of the cutter bar over the ground, and the greater the opening of the spring actuator, the greater the pressure of the cutter bar over the ground.

4. The floating system according to claim 1, further comprising a side floating system of a chassis;

wherein the side floating system of the chassis mechanically connects a chassis side portion of the combine harvester platform with respect to a chassis center portion of the combine harvester platform;

the side floating system of the chassis moves the chassis side portion of the combine harvester platform vertically with respect to the ground and the chassis side portion of the combine harvester platform pivotally with respect to the chassis center portion of the combine harvester platform.

5. A combine harvester platform comprising:

the reel and cutter bar floating system according to claim 1; and a feeding system comprising an upper center conveyor, wherein said upper center conveyor moves with respect to a lower center conveyor.

6. A reel and cutter bar floating system for a combine harvester platform, comprising:

a reel support element;

a cutter bar support member;

a side floating system of a chassis;

wherein the reel support element and the cutter bar support member are slidably connected to a chassis pipe of the combine harvester platform by means of a reel pivot element;

wherein the reel pivot element mechanically connects the reel support element and the cutter bar support element; and the reel pivot element is configured to regulate the fluctuation between the cutter bar support member and the reel support element, wherein the side floating system of the chassis mechanically connects a chassis side portion of the combine harvester platform with respect to a chassis center portion of the combine harvester platform, the side floating system of the chassis moves the chassis side portion of the combine harvester platform vertically with respect to the ground and the chassis side portion of the combine harvester platform pivotally with respect to the chassis center portion of the combine harvester platform, wherein the side floating system of the chassis comprises a pivoting arm, a spring support, a spring rod and a lifting spring;

the pivoting arm mechanically connects the chassis side portion of the combine harvester platform with respect to the chassis center portion of the combine harvester platform;

the spring support and the spring rod secure the lifting spring in a position between the chassis side portion of the combine harvester platform and the chassis center portion of the combine harvester platform; and the lifting spring moves the chassis side portion of the combine harvester platform vertically with respect to the ground, and the pivoting arm pivots the chassis side portion of the combine harvester platform with respect to the chassis center portion of the combine harvester platform.

* * * * *